(12) United States Patent  
Günther et al.

(10) Patent No.: US 7,753,624 B2
(45) Date of Patent: Jul. 13, 2010

(54) CUTTING TOOL AND METHOD FOR CUTTING MATERIAL

(75) Inventors: Carsten Günther, Limbach-Oberfrohna (DE); Jan Eggink, Dieren (NL); Jan Van Frankenhuyzen, Schoonrewoerd (NL)

(73) Assignee: Sandvik Intellectual Property AB, Sandviken (SE)

( * ) Notice: Subject to any disclaimer, the term of this patent is extended or adjusted under 35 U.S.C. 154(b) by 261 days.

(21) Appl. No.: 10/590,509

(22) PCT Filed: Mar. 14, 2005

(86) PCT No.: PCT/EP2005/051129

§ 371 (c)(1),
(2), (4) Date: Jun. 12, 2007

(87) PCT Pub. No.: WO2005/089991

PCT Pub. Date: Sep. 29, 2005

(65) Prior Publication Data

US 2007/0258777 A1 Nov. 8, 2007

(30) Foreign Application Priority Data

Mar. 12, 2004 (EP) ................................. 04075799
Nov. 30, 2004 (EP) ................................. 04078252

(51) Int. Cl.
*B23C 5/10* (2006.01)
*B23C 5/00* (2006.01)

(52) U.S. Cl. .......................................... 407/53; 407/30
(58) Field of Classification Search .................. 407/30, 407/35, 53, 54, 56, 64
See application file for complete search history.

(56) References Cited

U.S. PATENT DOCUMENTS

| 5,094,573 | A | * | 3/1992 | Hougen | 409/132 |
| 5,236,291 | A | * | 8/1993 | Agapiou et al. | 408/211 |
| 6,056,485 | A | * | 5/2000 | Magill et al. | 407/54 |
| 6,257,807 | B1 | | 7/2001 | Heinloth | 407/113 |
| 6,435,780 | B1 | * | 8/2002 | Flynn | 407/53 |
| 2002/0085887 | A1 | * | 7/2002 | Schneider et al. | 407/30 |

FOREIGN PATENT DOCUMENTS

| EP | 0 088 505 | 9/1983 |
| EP | 1 075 889 | 2/2001 |
| GB | 2 184 373 | 6/1987 |

* cited by examiner

*Primary Examiner*—Will Fridie, Jr.
(74) *Attorney, Agent, or Firm*—Drinker Biddle & Reath LLP (57) ABSTRACT

Tool for cutting materials with a rotatable body having a rotation axis and cutting edges for cutting the material during movement of the body in a first direction parallel to the rotation axis. In order to stabilize the tool during cutting the cutting edges comprise inner cutting edges laying on a first surface of revolution which is in the first direction higher at a larger diameter and lower at a smaller diameter. The invention includes methods for using the tool.

22 Claims, 9 Drawing Sheets

CUTTING TOOL AND METHOD FOR CUTTING MATERIAL

The invention concerns a tool for cutting materials in accordance with the preamble of claim 1. The known cutting tool has the disadvantage that when cutting a cutting section that is asymmetrical the cutting tool tends to drift sideways in a direction perpendicular to the rotation axis. This leads to inaccuracies and requires that material be machined at a lower cutting speed and/or feed rate.

In particular, the present invention is related to a cutting tool which is designed as an end mill, wherein, however, said end mill is particularly configured for axial milling, i.e. axial feed direction during cutting.

Axial milling is a cutting operation which is particularly effective for the production of deep recesses, which require a corresponding large volume of material to be chipped.

A normal end mill would only be used for small amounts of axial feed while the major feeding direction would be perpendicular to the axis of the tool in order to produce a recess of arbitrary shape in a workpiece, e.g. a slot, having a width which is equal to or larger than the diameter of the mill. With the ordinary use of an end mill, the latter would first be fed axially by a certain small depth and then moved laterally in order to produce a slot with a depth corresponding to the original depth of axial feed. Another way of operation would be a simultaneous axial and lateral feed, thereby producing an inclined bottom ramp surface wherein the axial feed rate would typically be smaller than the lateral feed rate. These steps may be repeated for increasing the depth of the slot until a final depth is reached, wherein the lateral feed would always occur after a corresponding axial feed or together therewith.

However, in cases where the axial depth of a recess is comparatively large in comparison to the lateral and longitudinal extension thereof, it turned out that an operation by stepwise increasing the depth of a slot is less effective than an operation similar to a repeated drilling, wherein the axial feed of the tool is made such that the desired final depth of the recess is immediately obtained by only axially feeding the tool and then repeating said step after the tool has been cleared from the hole and then laterally shifted, whereupon the axial feed occurs again. Once the tool is shifted by an amount equal to or larger than the diameter of the tool, a separate circular hole would be milled. However, this would be an operation corresponding to just drilling a number of adjacent circular holes, wherein the drilling operation may have particular disadvantages regarding chip removal because the hole as being drilled is substantially plugged by the tool itself and the maximum feed rates may have to be kept way too small in order to ensure a sufficient chip removal through the flutes of a corresponding drill. Accordingly, with a milling tool which is sufficiently stable in order to withstand lateral forces causing a drift sideways in a direction perpendicular to the rotation axis, the lateral shift of the respective milling tools between the individual axial feed steps occurs by less than a tool diameter and in particular even by less than half of the toll diameter. Accordingly, upon each step of axial feed, a more or less sickle-shaped portion of the workpiece is machined and chipped, starting out from a circular hole. In that case, the previously machined portions of the recess provide a sufficient space for receiving and removing the chips, even if the chip flutes are not very wide and even if the axial extension of the chip flutes may be less than the axial depth of the recess produced, which would never be possible with an ordinary drilling operation. Therefore, with a corresponding milling operation it is possible to use a milling tool having rather short chip flutes and a cutting portion at the front end of the tool which is axially shorter than the depth of the recesses produced therewith, which results in the effect that the shaft portion of the tool starting immediately adjacent the cutting end is more stable and rigid and better withstands lateral cutting forces which might tend to deflect the tool from the straight axial feed direction.

However, up to now it has not been possible to provide corresponding milling tools mainly designed for axial milling as described heretofore, and having diameters below and well below 30 mm. This is due to the fact that the asymmetrical forces acting on the tool once just the sickle-shaped portion of the workpiece is milled, in particular hard and tough workpieces such as stainless steel, are so strong that an ordinary milling tool having a diameter of less than 30 mm would be deflected sideways and perpendicular to the direction of the stepwise movement of the tool, such that the resulting recess would become inaccurate if the prior art tools were used with diameters of less or even substantially less than 30 mm.

In view of the above, it is an object of the present invention to present a cutting tool, in particular a milling tool designed for mainly axial milling, which in operation is more stable and is subjected to only small lateral cutting forces, even if asymmetric axial milling occurs, i.e. an axial milling operation, wherein the material to be machined is not homogeneously distributed over the cross-section of the tool.

According to one aspect of the invention, a corresponding tool is designed in accordance with the characterizing part of claim 1. During machining the inner cutting edges will generate stabilising forces on the cutting tool that prevent sideways drifting, so that more accurate machining at a higher cutting speed and/or feed rate can be achieved.

Since the stabilising effect is obtained by the cutting edges at the front end of the mill, the rigidity of the shank becomes a less important factor, even though still principally important, which results in the effect that corresponding milling tools may be used for asymmetrical milling operations even with tool diameters well below 30 mm and in particular in the range from 2.5 to 30 mm. For larger dimensions, the formation of the cutting edges according to the present invention is still advantageous even though not inevitable in order to ensure a sufficient accuracy of the structures generated by the tools. Still, even with larger diameters, tools using the advantageous features of the invention will be subjected to a reduced mechanical stress and correspondingly reduced vibration and wear.

In a preferred embodiment of the present invention the tool is according to claim 2. In this way the rotating cutting tool is further stabilised during cutting.

In another preferred embodiment of the present invention the tool is according to claim 5. In this way the forces on the cutting edges are more constant.

In still another preferred embodiment of the present invention the tool is according to claim 6. This will ensure that the inner cutting edges generate sufficient stabilising force on the body.

In another preferred embodiment of the present invention the tool is according to claim 8. This facilitates sharpening of the cutting edges, for instance by grinding.

In a further preferred embodiment of the present invention the tool is according to claim 10. By giving the first cone and the second cone approximately the same top angle the chips cut from the material will have a similar shape, which makes handling easier.

In still a further embodiment of the present invention the tool is according to claim 12. The support planes support the body for preventing sideways movement, thereby further stabilising the cutting tool during machining.

In another preferred embodiment of the present invention the tool is according to claim 13. This makes sharpening of the cutting edges easier.

In still another preferred embodiment of the present invention the tool is according to claim 14. In this way the supporting planes and the cutting edges are at the same location so that slots for chip removal can be made easier.

In a further preferred embodiment of the present invention the tool is according to claim 15. This makes it possible to have sufficient cutting edges cutting at one time while the cutting teeth remain sufficiently strong to withstand the cutting forces.

In still a further preferred embodiment of the present invention the tool is according to claim 16. This makes is possible to machine deep slots and openings with the cutting tool.

The invention also concerns a method according to the preamble of claim 18. The disadvantage of this method is that during cutting the cutting tool may drift sideways due to variable forces on the body. In order to overcome this disadvantage the method is according to the characterizing part of claim 18. This ensures that the inner cutting edges and the outer cutting edges are subject to the same cutting forces and so stabilize the tool during cutting.

The invention also concerns a method according to the preamble of claim 19. The disadvantage of this method is that during cutting the cutting tool may drift due to variable forces on the body. In order to overcome this disadvantage the method is according to the characterizing part of claim 19. This ensures that the changing forces on the inner cutting edges when starting to cut the material or ending to cut the material are stabilised by at least one other inner cutting edge engaged in cutting the material.

The invention is further explained and illustrated with reference to the following embodiments and accompanying drawings which, however, should not be construed as limiting the invention in any respect.

Figure 1:
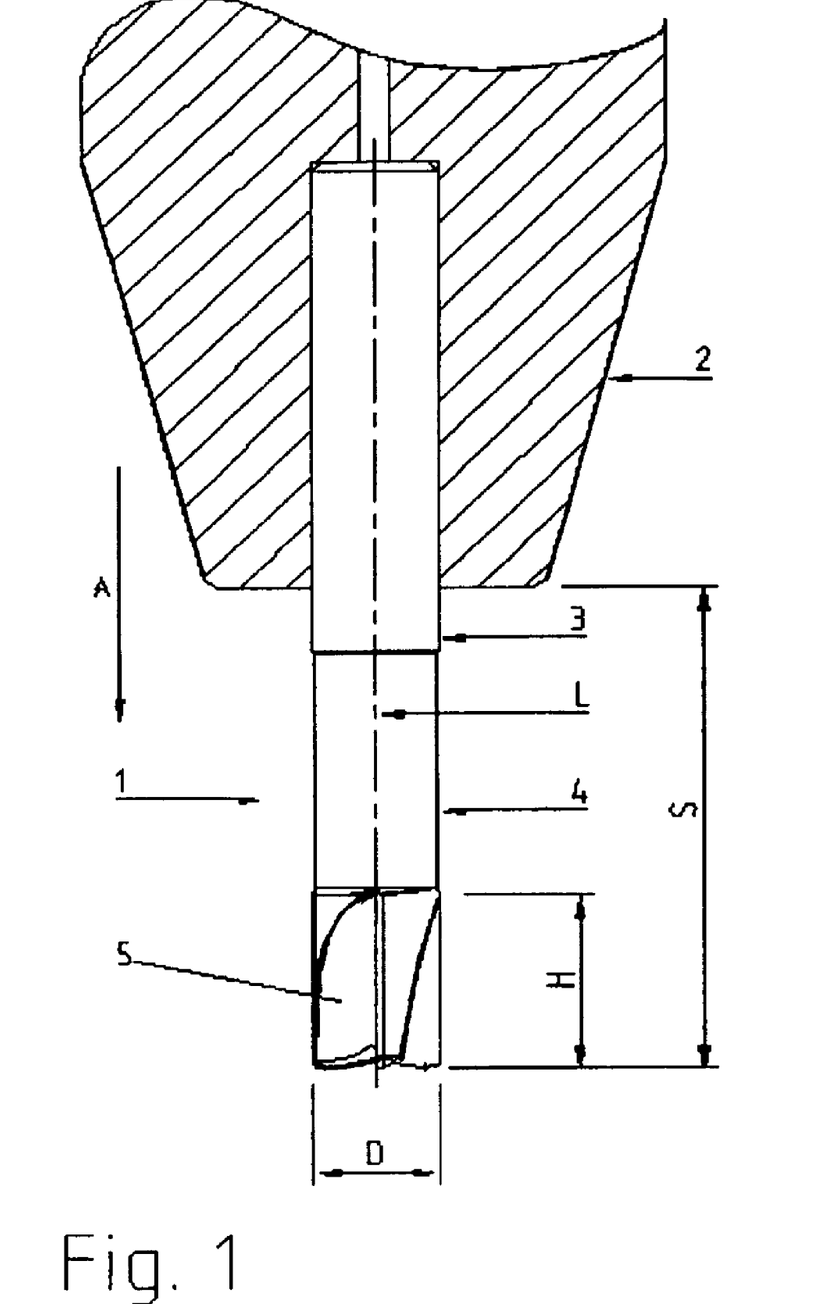
FIG. 1 is a side view of a first embodiment of a cutting tool.
Figure 2:
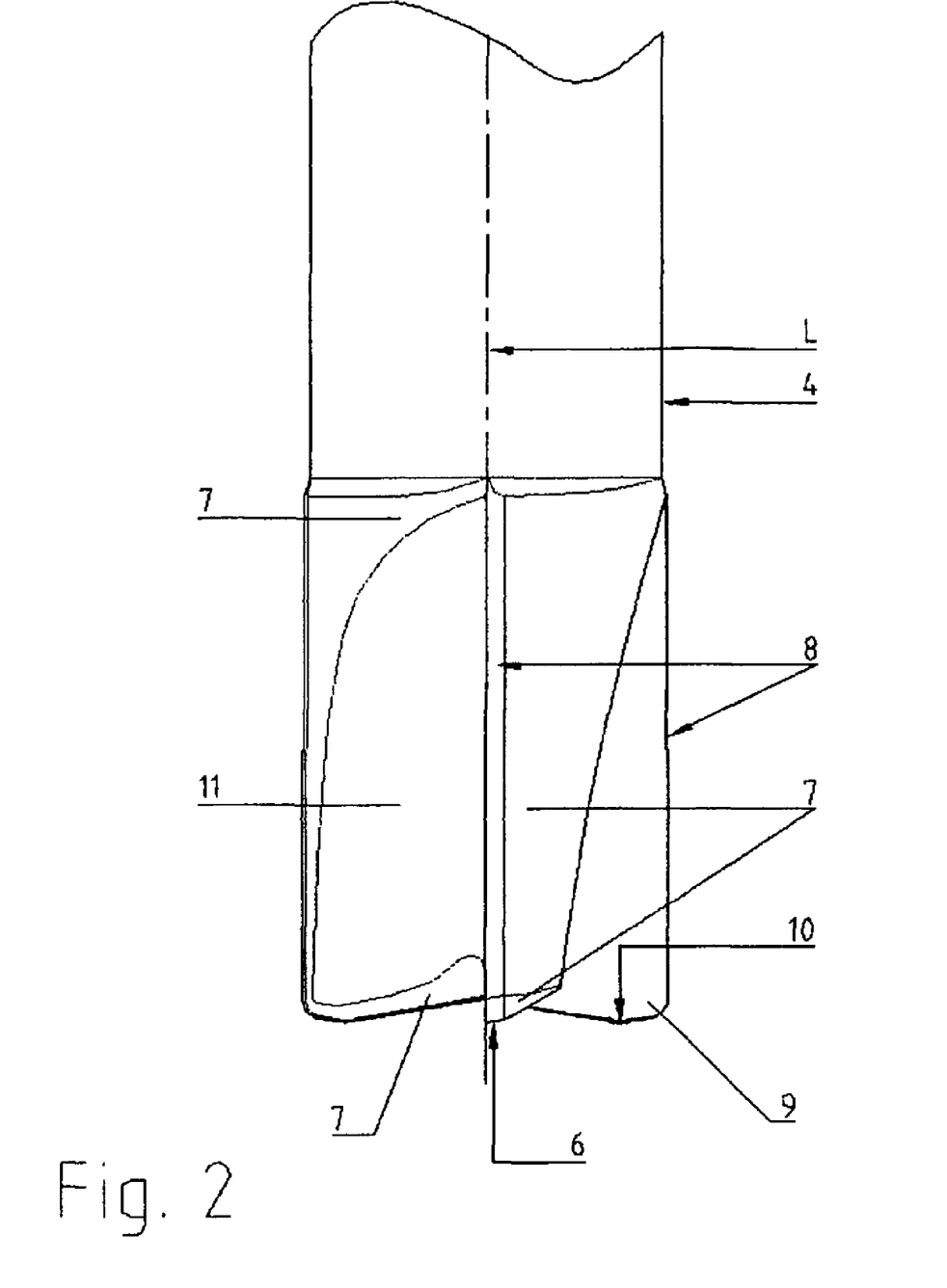
FIG. 2 is a side view of the cutting body of the cutting tool of FIG. 1 in more detail.
Figure 3:
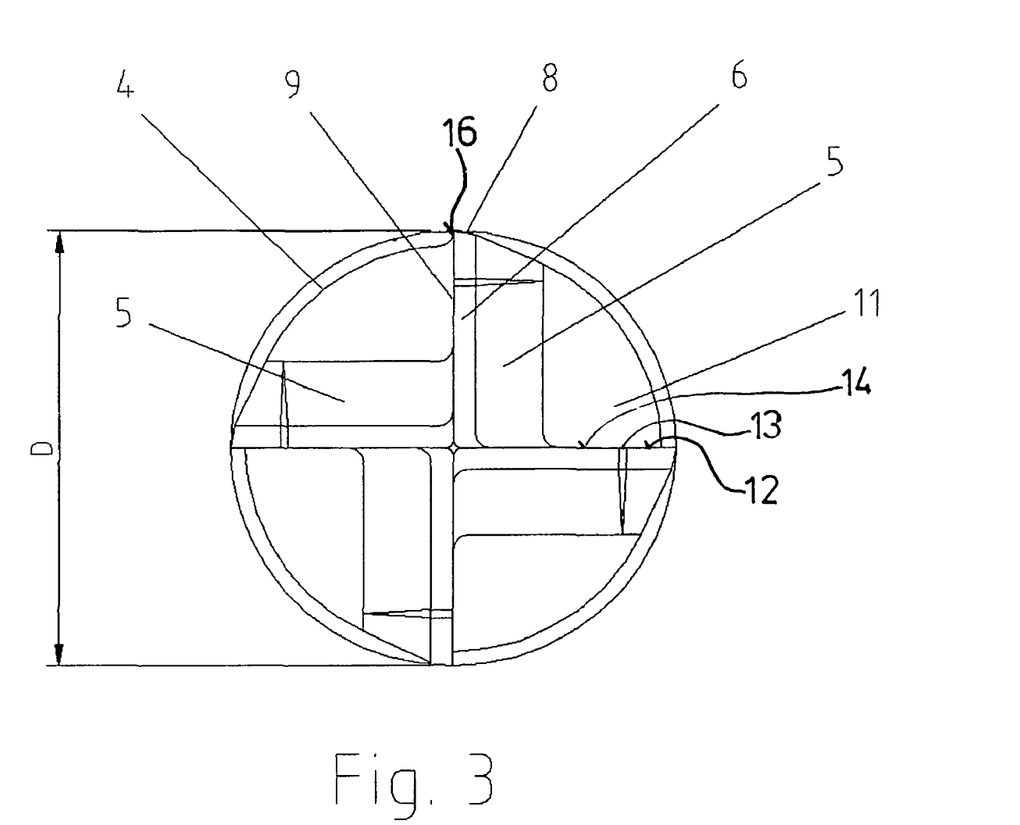
FIG. 3 is a bottom view of the cutting body of the cutting tool of FIG. 1.

FIGS. 1, 2 and 3 show a cutting tool 1 with a clamping surface 3 clamped in a tool clamp 2. The tool clamp 2 is part of a machine tool which is numerical or conventional controlled and can position and move the cutting tool towards the to be machined part. During use the cutting tool 1 is rotated around a rotation axis L with a rotation speed and fed with a feed rate A in a feed direction into material to be cut. The cutting tool 1 is provided with cutting teeth 5 which are connected by a shank 4 with the clamping surface 3. The number of cutting teeth may vary and is usually in the range of two to five, preferably four. The cutting teeth 5 have a cutting diameter D and a cutting height H. At the side away from the shank 4, the underside, the cutting teeth 5 have cutting edges 10 for cutting the material. Due to the fact that the cutting edges 10 are at the end of the cutting tool 1 this type of tool is also known as an end mill. At the circumference the cutting teeth 5 have support faces 8, which during machining a part support the cutting tool 1 against the cylindrical surface that remains of the part after machining. The cutting tool 1 as depicted has four cutting teeth 5, the cutting edges 10 are at a distance L from the tool clamp 2 and this distance is at least four times the diameter D, so that also narrow and deep slots can be machined.

The cutting teeth 5 are generated by machining flutes 11 in a cylindrical body, for instance by grinding, which means that the cutting teeth are one piece with the tool body. The outer dimensions of the cylindrical body are identical to the final outer dimensions of the support planes 8 and the cutting edges 10. Machining of the flutes 11 creates the cutting faces 9 which intersect with the outer circumference of the cylindrical body so creating the cutting edge 10 at the underside and a sharp edge along the support face 8. In the shown embodiment there are four flutes 11 but the number may vary, usually in the range from about two to about five. In this embodiment cutting faces 9 are in a plane that includes the rotation axis L but this is not essential.

At the underside of the cutting tool 1 approximately perpendicular to each cutting face 9 the cutting teeth 5 have a first relief face 6 along the cutting edge 10 so that during use the underside of the cutting tooth 5 does not interfere with the material to be cut. The first relief face 6 and the cutting face 9 have such angles relative each other and relative to the direction of movement of the material due to the rotation of the cutting tool 1 that the cutting conditions for that material and the further cutting conditions are optimized in a known way.

The cutting tooth 5 has sufficient thickness for taking up the cutting forces generated on the cutting face 9 during use. In order that the cutting tooth 5 remains free on the underside of cutting tool 1 from the material to be machined, there is machined at the underside of the cutting tooth 5 a second relief face 7 which makes sure that the underside of the cutting tooth 5 remains inside the body of revolution generated by the cutting edge 10. The second relief face 7 is continued upward along the length of the support face 8 so that from the outer circumference of the cylindrical body there remains only a narrow band as the support face 8, which reduces the friction against the machined material.

Figure 4:
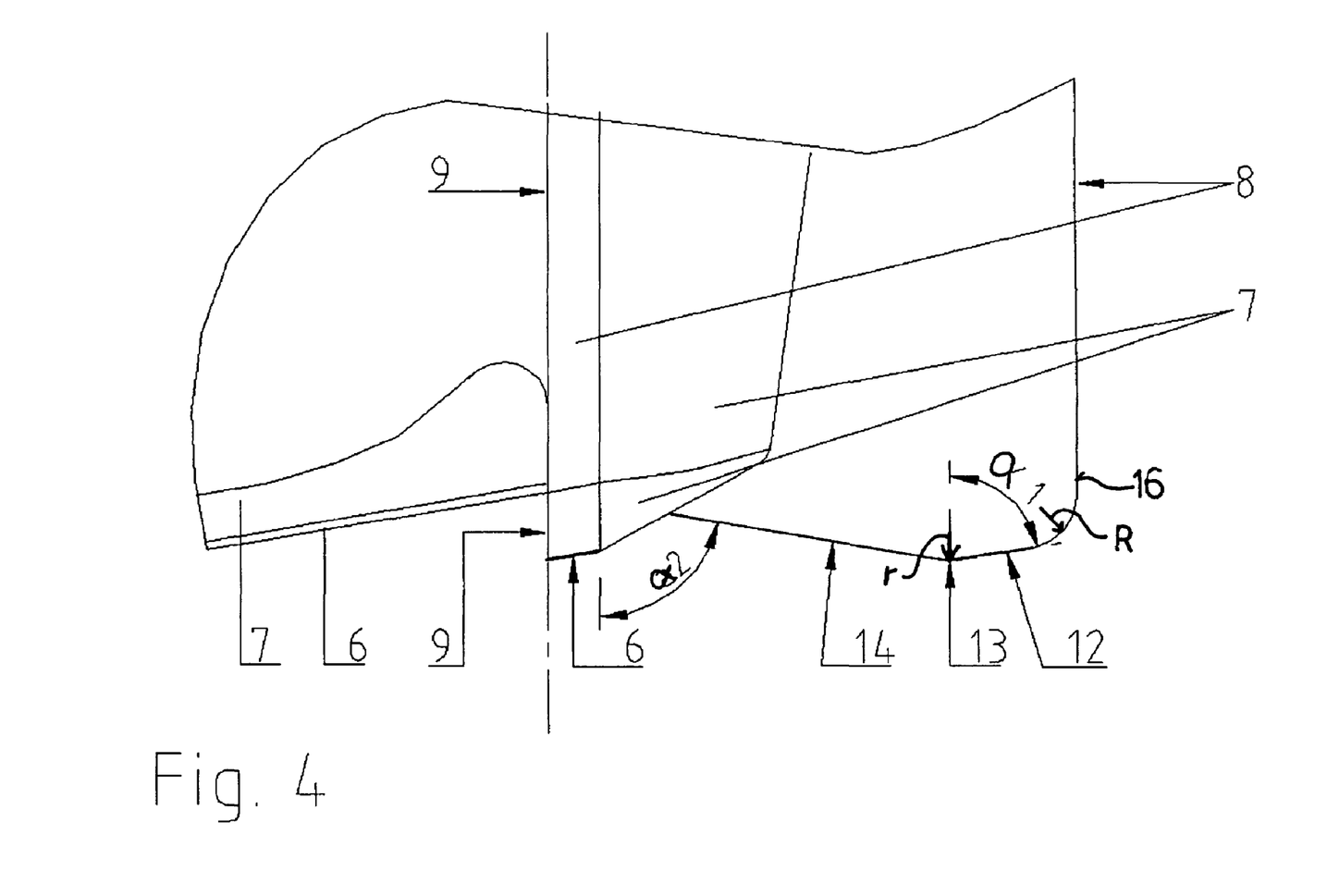
FIG. 4 is a side view of the cutting edges of the cutting tool of FIG. 1 in more detail.

In FIG. 4 the cutting edge 10 is shown in more detail. The cutting edge 10 comprises an outer cutting edge 12, which is approximately a straight line making an angle $\alpha_1$ with the direction of the rotation axis L and which is limited at the outside diameter by the support face 8 and at the inside by a lower limit 13, which is the lowest point of the cutting tooth 5. The angle $\alpha_1$ generally has a value of approximately 80 degrees but may be in the range from between 60 degrees to 90 degrees, with a preferred range of 75 degrees to 88 degrees and most preferred between 80 degrees and 87 degrees. When the angle $\alpha_1$ approaches a value of 90°, the surface of revolution generated by the rotating outer cutting edge is a small cone or just a flat plane.

Inside the lower limit 13 the cutting edge 10 comprises an inner cutting edge 14 which is an approximately straight line making an angle $\alpha_2$ with the direction of the rotation axis L. The angle $\alpha_2$ generally has a value of approximately 80 degrees and preferably falls within the range from 60 degrees to 90 degrees, in particular 75 degrees to 88 degrees and most preferred 77 degrees to 85 degrees. Accordingly, the surface of revolution generated by the rotating inner cutting edge 14 is a cone.

As the counteracting forces imparted from the workpiece on the cutting tool at the cutting edges thereof are acting on both sides of the lower limit 13 and thus have opposite directions, the resulting force on the cutting tooth 5 in the plane perpendicular to the rotation axis L is reduced, so that the tool is more stable during cutting. In the case where $\alpha_1$ is approximately 90 degrees, the force generated on the inner cutting edge 14 (and having an angle $\alpha_2<90°$) is compensated by the forces on the support face 8. The support faces 8 are actually relief faces with respect to minor cutting edges extending parallel to the axis L of the tool at the outside diameter thereof in the vicinity of the front end. However, since the feed of the tool occurs along the axial direction, the relief angle of the surfaces 8 may be rather small and in particular close to zero just as with a drill, so that they can act indeed as support surfaces in the radial direction. Moreover, the minor cutting edges are slightly tilted inwardly towards the axis of the tool when going from the front end towards the rear end of the chip flutes, which gives the tool space to freely rotate preventing additional friction and thus also preventing additional forces urging the tool radially away from the work piece.

The transition from the cutting edge 12 towards the minor cutting edge 16 (which would be the main cutting edge for an ordinary end mill) is rounded with a radius R which is typically in the order of ⅕ to ½₀ of the tool diameter D and which also results in a radial inwardly directed force during the cutting operation counteracting the radial outwardly directed forces imparted by the (oppositely) sloping inner cutting edges due to their engagement with the workpiece.

The radius r at the tip 13 forming the transition from the outer cutting edge 12 to the inner cutting edge 14 is in the order of 0.1 to 2 mm and preferably around 0.2 mm.

In the embodiment shown in FIGS. 1 to 4, the angles $\alpha_1$ and $\alpha_2$ have nearly the same value and fall in the range of 75 to 80 degrees. However, the said two angles $\alpha_1$ and $\alpha_2$ do not have to be identical, wherein there should be noted that the larger the value of the angles $\alpha_1$, $\alpha_2$, the smaller are the lateral (centering and balancing) forces generated by the cutting forces or more precisely the forces counteracting the cutting forces. However, if for instance the angle $\alpha_1$ is larger than $\alpha_2$, this may be compensated by a greater length of cutting 14 engaging the workpiece than cutting edge 12. Moreover, a force acting toward the axis L is also generated by the rounded portion having the radius R at the transition from the outer cutting edge 12 to the minor cutting edge 16, which again is to be balanced by an additional length of cutting edge 14 engaging the workpiece. This will in particular be described in more detail with respect to FIGS. 7 to 9.

Figure 5:
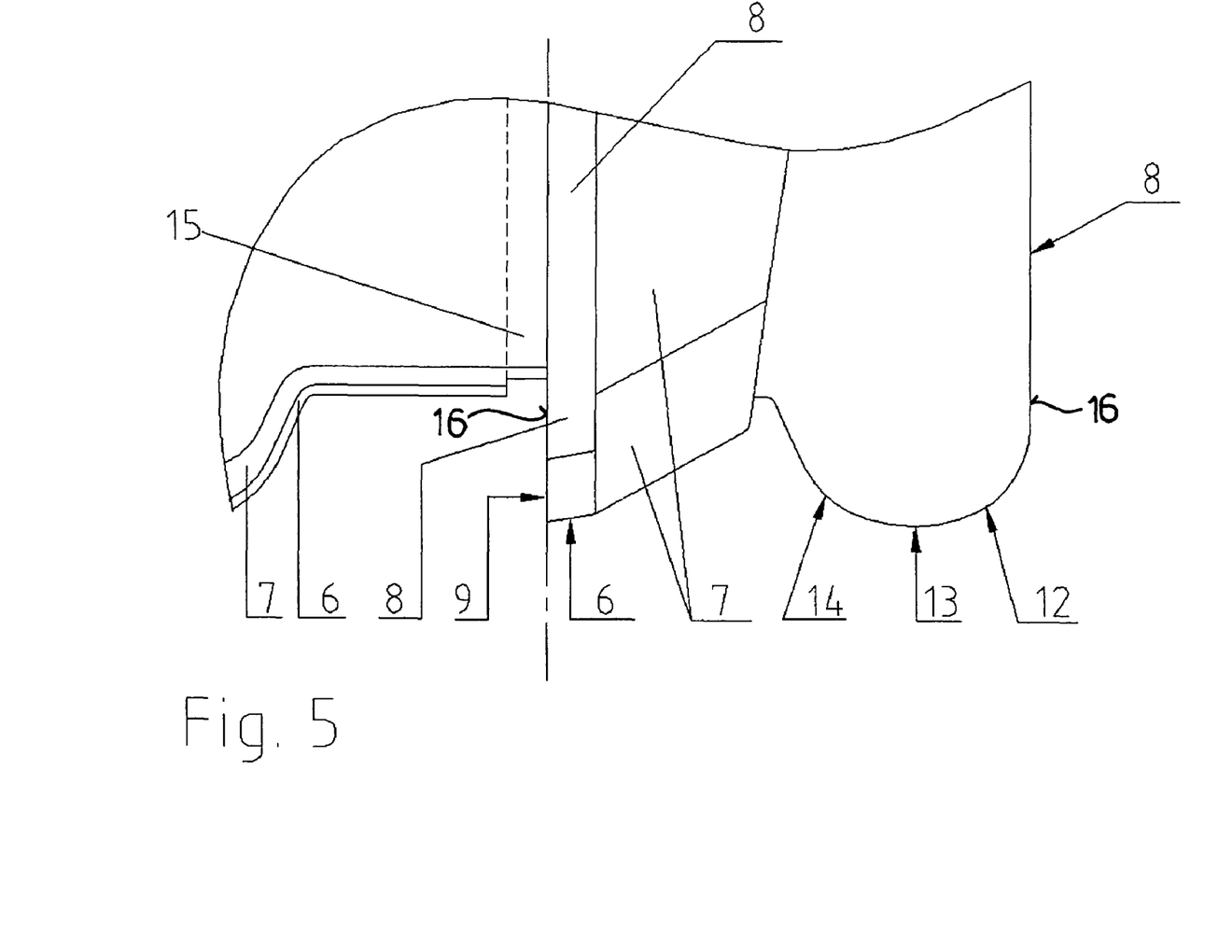
FIG. 5 is a side view similar to the view of FIG. 4 of the cutting edges of a second embodiment of a cutting tool.
Figure 6:
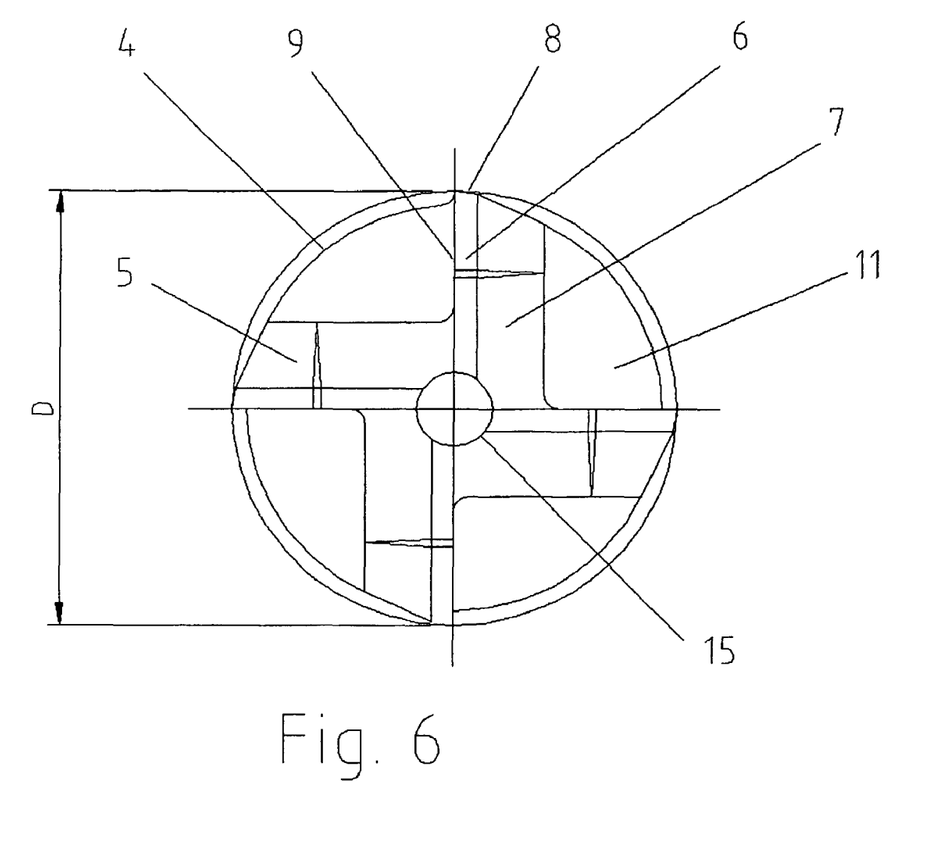
FIG. 6 is a bottom view of the cutting edges of the cutting tool of FIG. 5.

FIGS. 5 and 6 show a second embodiment of a cutting tool, wherein the inner cutting edge 14 and the outer cutting edge 12 both end in a lower limit 13 and have a shape different from a straight line. Due to the fact that the lower limit 13 has a distance from the rotation axis L and there is an inner cutting edge 14 during cutting the tool is more stable. In this embodiment a canal 15 is shown for providing cooling fluid. Alternatively, cooling fluid may be supplied externally or through the shaft.

As can be seen from both, FIG. 3 and FIG. 6, the four teeth of said tool are identical and the tip portions 13 of the cutting teeth do all have about the same distance to the centre of the tool, i.e. the circle defining the position of the tip portion 13 is the same for all of the cutting tooth, which is at present the preferred embodiment. However, embodiments may be contemplated where just pairs of opposite cutting teeth may be formed in which the tip portions have the same distance to the centre of the tool, while other pairs of oppositely arranged teeth may have a position of their portions which is different from the first-mentioned one.

Figure 7:
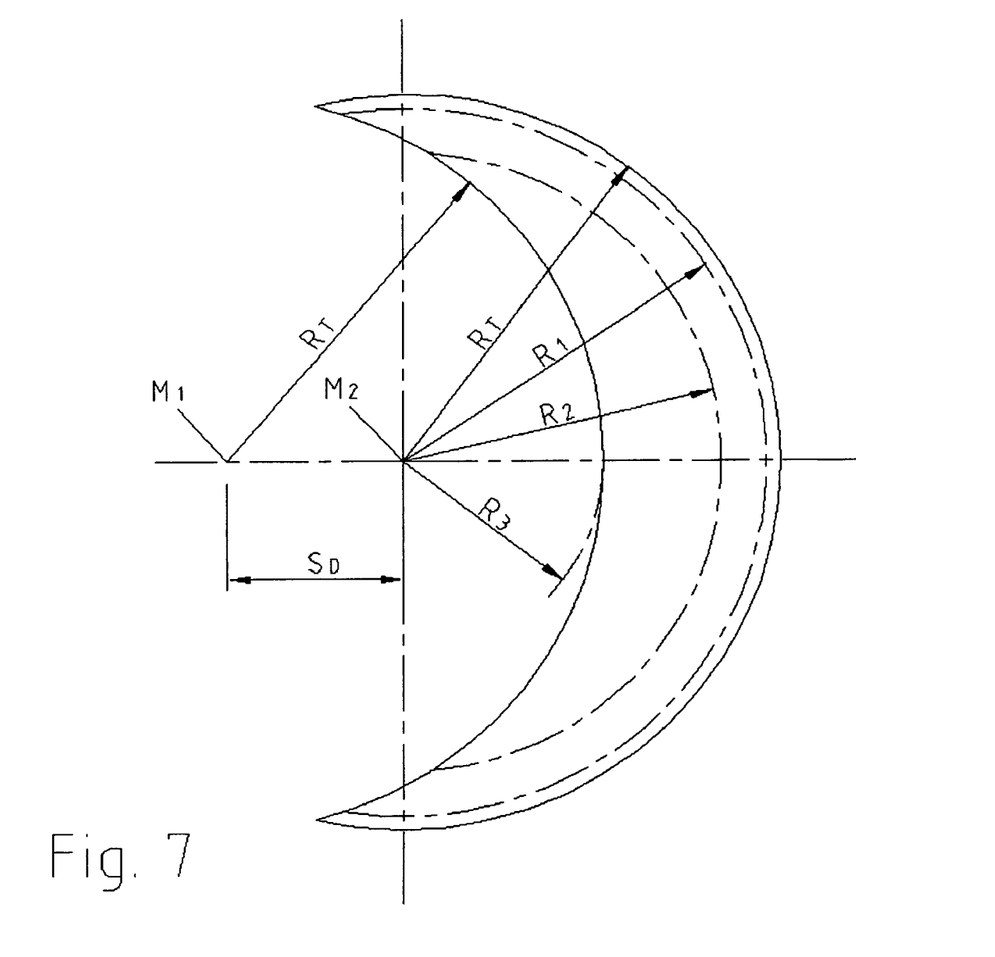
FIG. 7 is a schematic view of the sickle-shaped area cut by the cutting tool of FIG. 1 when machining with a step-distance of 0.2 of the cutting tool diameter.
Figure 8:
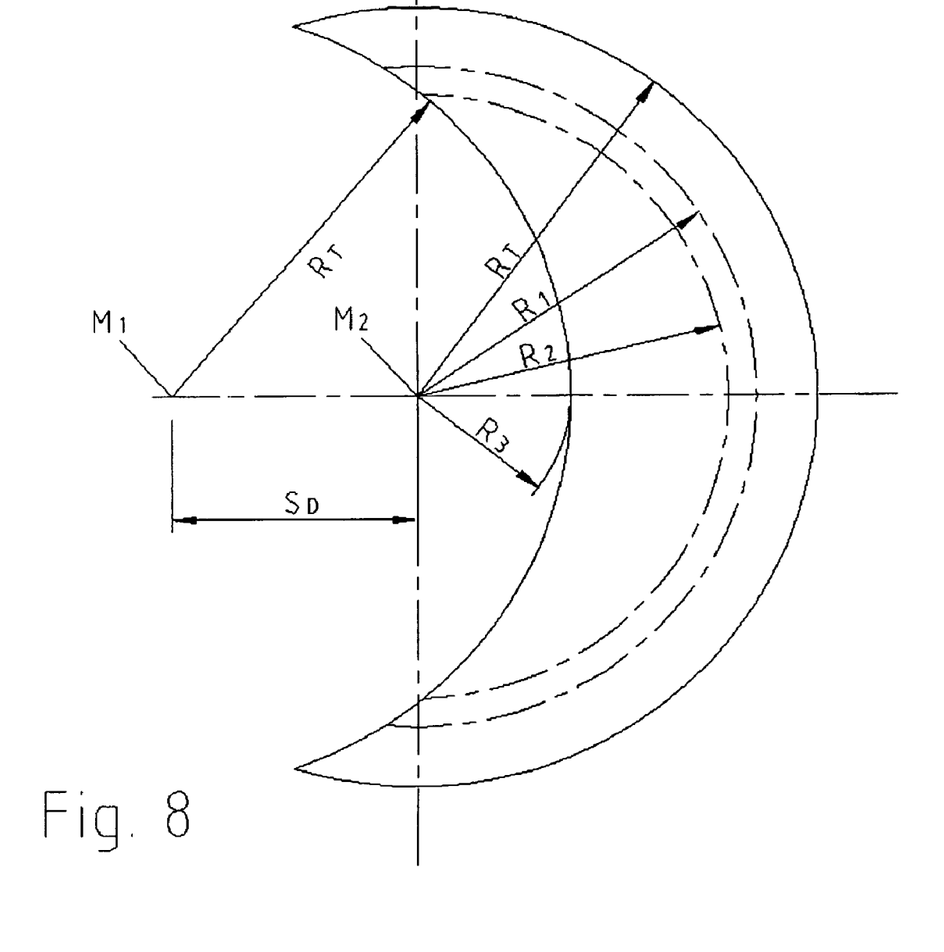
FIG. 8 is a schematic view of the sickle-shaped area cut by the cutting tool of FIG. 1 when machining with a step-distance of 0.3 of the cutting tool diameter.
Figure 9:
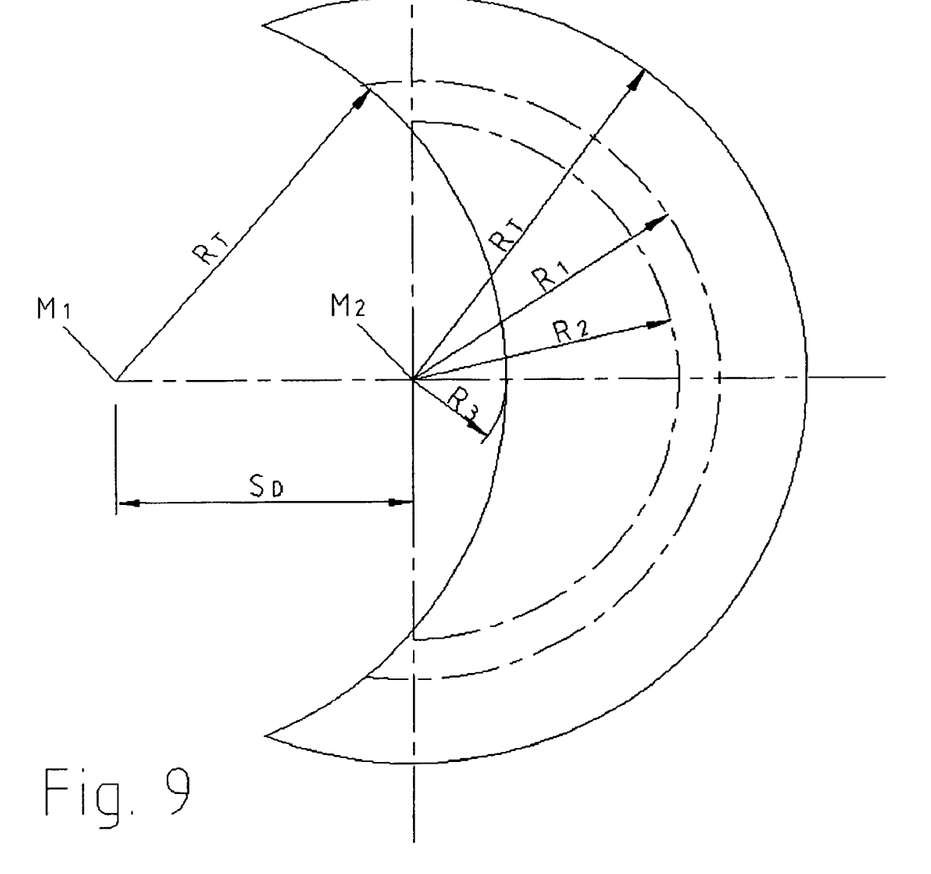
FIG. 9 is a schematic view of the sickle-shaped area cut by the cutting tool of FIG. 1 when machining with a step-distance of 0.4 of the cutting tool diameter.

Further, as can be seen from both, FIG. 3 and FIG. 6, the minor cutting edges 16 are comprising a rather small relief angle, resulting in the effect that a lateral feed of the milling tool into a workpiece is almost impossible; however, cutting edges 16 may still be active in a situation where a slot is produced in the manner as discussed with respect to FIGS. 7 to 9 which is formed by a number of widely overlapping drilling holes, causing a wavy shape of the walls of a slot or any other recess produced thereby. Once a corresponding slot is formed just by axial milling, there may still occur a lateral feed of the tool along the longitudinal direction of the slot and in parallel to the wavy walls thereof, wherein the minor cutting edges 16 will become active and cut away the inwardly projecting portions of the wavy side walls, which finally results in a smooth surface of the groove or recess produced by means of the present tool.

If the said groove or recess has a depth which is larger than the height H of the front end of the tool bearing the minor cutting edges, it may become necessary that, at a first smoothing step, the tool is retracted from the slot until only the front end engages the slot at a depth of less than H, whereupon the lateral movement of the tool may occur, while in the next step the tool is again axially advanced by a little less than the maximum distance of H and again advanced in the lateral direction along the slot or the wall of the respective recess, which is repeated until the final depth of the recess or groove is reached.

In addition to the embodiments shown here the design of the cutting edges 10 can be used in end mills of different shape. For instance the number of flutes 11 can be changed, the cutting face 9 can be helical and/or the cutting height H can be reduced or increased to ten or twenty times the cutting diameter D. The cutting tool 1 can be made from HSS or from carbide and, if desired, it can be coated with a TiN coating or any other suitable coating. Instead of making the cutting tool 1 from a full body as shown here carbide inserts can be used for the cutting edges 10.

In FIG. 7 the area is shown of the material that is removed during machining with the cutting tool 1. The cutting tool 1 has a diameter D and an axis of rotation L. In a first pass the cutting tool 1 is with its axis of rotation L in a rotation centre $M_d$ le rotating with a rotation speed that is dependent on the maximal allowable speed at the circumference of the cutting tool 1 inserted with a feed rate A in the direction of the rotation axis L and it removes material with a cutting radius $R_T$ which equals 0.5 D. After cutting the first pass the cutting tool 1 is retracted by the machine tool and is moved a step distance $S_D$, so that the axis of rotation L is now in a rotation centre $M_2$ and the cutting tool 1 is inserted in the direction of the rotation axis L. As a result a sickle-shaped area of material is removed.

If the cutting depth is larger than the length H of the cutting tooth, a corresponding drill may be used for the first pass or otherwise a tool according to the present invention may be used in which the shank portion immediately adjacent the front end cutting portion has a reduced diameter such that the chips machined by the front end may still be removed and transported by the chip flutes and past the shank portion of reduced diameter. As an alternative, it may be necessary that after the first pass is made down to a depth less than H, the cutting tool is retracted and moved by the step distance $S_D$ and again axially fed by a distance H or slightly less than 2H because the neighboring hole already produced to a depth H allows the removal of the chips from the deeper portions of the second pass. This may be repeated until the final desired depth is reached, whereupon the milling process may be continued by further removing sickle-shaped areas and axially feeding the tool along the full depth of the respective groove or recess.

In FIG. 7 the step distance $S_D$ is 0.2 D or 0.4 $R_T$. It can be seen that the material is cut in a narrow sickle near the outer circumference of the cutting tool 1, so that the cutting speed is near the maximum allowable cutting speed at the circumference for the larger part of the sickle-shaped area. As the cutting insert is also fairly high near the inside diameter of the sickle-shaped area the feed rate a can be set at a high value so that the cutting capacity of the cutting tool 1 using this step distance $S_D$ is high.

By increasing the step distance $S_D$ as shown in FIGS. 8 and 9 the sickle-shaped area that is machined in one pass will be increased. This results in less loss of time required for repositioning step distance $S_D$, while the feed rate A has to be reduced as the cutting conditions near the axis of rotation L deteriorate. For this reason the optimal cutting conditions and the optimal step distance $S_D$ will depend on the material to be cut, and on the material of the cutting tool 1. It has been found that in general good cutting results and cutting capacity are obtained if the step distance $S_D$ is approximately 0.3 D as shown in FIG. 8.

The stability of cutting with the cutting tool 1 depends on the design of the cutting edge 10 and especially on the radius of the limit 13. The preferred solution for the radius of the lower limit 13 of the cutting edge 10 is the radius whereby the volume machined by the inner cutting edges 14 from the sickle-shaped area is equal to the volume of the sickle-shaped area machined by the outer cutting edges 12. An approximation for the minimum value of this radius is given. In FIGS. 7, 8 and 9 a first radius $R_1$ is shown which is the minimum value of the radius of the lower limit 13 and also a small radius $R_3$, which is the smallest radius that the cutting edge 10 cuts the sickle-shaped area. The value of $R_3$ is equal to the tool radius $R_T$ minus the step distance $S_D$. The first radius $R_1$ is calculated such that a ring with an inner radius equal to the small radius $R_3$ and an outer radius equal to the first radius $R_1$ has the same surface as a ring with an inner radius equal to the first radius $R_1$ and an outer radius equal to the tool radius $R_T$. It has found that if the lower limit 13 of the cutting edge 10 at least equals the first radius $R_1$ the cutting forces on the inner cutting edge 14 would stabilize the cutting tool 1 adequately. It should be noted, however, that the drawings are not perfectly in scale and that in particular $R_1$ in FIG. 7 is shown somewhat to large.

In some circumstances stabilization is found if at least two inner cutting edges 14 are cutting the sickle-shaped area. In the situation in which there are four cutting teeth 5 the lower limit 13 of the cutting edge 10 should be at least equal to a second radius $R_2$. In situations where there are more cutting teeth 5, which is possible with larger diameters D, the second radius $R_2$ wherein there are at least two inner cutting edges 14 cutting the sickle-shaped area can be made smaller. In such situations it is still preferred to have the radius of the lower limit 13 of the cutting edge 10 at least equal to the first radius.

As already mentioned, the relative amounts of material to be machined by the inner cutting edge 14 and the outer cutting edge 12, respectively, depends on the particular radial forces generated by the engagement of a length of cutting edge with the material of the workpiece. Since these forces are less dependent on the rotational speed and distance from the centre rather than on the axial feed rate, the balancing conditions are a simple matter of geometry, wherein each individual section $\delta_i$ of a cutting edge engaging with the workpiece contributes a radial force proportional to $\delta_i \cos \alpha_1$ and $\delta_i \cos \alpha_2$, respectively, i denoting the respective inner or outer cutting edge, wherein of course the sign of the forces produced by a corresponding section $\delta i$ the inner cutting edge 14 is opposite (i.e. away from the centre axis) to the forces contributed from a length of the cutting edge 12 (causing radial inwardly-directed forces).

In summary, the optimum position of the circle $R_1$, i.e. the transition from the inner to the outer cutting edge, depends on a number of independently settable parameters such as the value of the angles $\alpha_1$, $\alpha_2$ and the step distance $S_D$ which determines the length of the section $\delta_i$ of the inner cutting edge, which gets into engagement with the workpiece, while the outer cutting edge is always fully engaged with the total length thereof (i.e. $\delta_1$ for the outer cutting edge is always identical with the total length of the outer cutting edge and substantially corresponds to the difference of the radii of $R_t$-$R_1$).

Further, once the radius at the transition from the outer cutting edge 12 to the minor cutting edge 18 increases, this transition may further increase the radial inwardly direction forces caused by cutting under axial feed. This may be compensated by reducing the angle $\alpha_2$ in comparison to the angle $\alpha_1$, resulting in a steeper slope of the inner cutting edge, increasing the radial outwardly directed reaction forces caused by the inner cutting edge and thereby compensating the larger forces due to a larger radius of the rounded transition from the outer cutting edge 12 to the minor cutting edge 8.

Moreover, with a tool having at least four cutting edges disposed around the cross-section of the tool at substantially equal circumferential distances of about 90°, there may be recognised on basis of FIGS. 7-9 that upon the first engagement with a sickle-shaped portion by an outer cutting edge 12, even the outer cutting edge 12 of a diametrically opposed cutting edge is still in engagement with the other end of the sickle-shaped section, wherein the inwardly directed forces caused by the engagement of these two outer cutting edges will compensate each other even without any contribution by inner cutting edges 14, because said outer cutting edges 12 are arranged at diametrically opposed locations.

However, for the cutting edge arranged at 90° between the two aforementioned cutting edges, there are no diametrically opposed edges in engagement with the workpiece, while both, the inner cutting edge 14 and the outer cutting edge 12 are in engagement with the workpiece at the prescribed position and cause counteracting forces which are substantially balanced once the transition point 13 is arranged at a properly selected radius $R_1$. Then, if the tool further rotates such that one of the first mentioned outer cutting edges leaves the sickle-shaped cutting portion, both, also the inner cutting edge on the diametrically opposed side is getting into engagement with the work piece in addition to the outer edge, which is already engaged, again tending to balance the forces resulting from the outer and inner cutting edges 12, 14, respectively.

Due to the particular geometry of the sickle-shaped section which is milled during the axial feed of the tool, there should be noted that the radial outwardly directed force generated by the engagement of the inner cutting edge with the workpiece, is constantly varying from a minimum value upon the first engagement with the sickle-shaped portion to a maximum value which is reached where the sickle shape has its widest dimension (i.e. along the direction of the step distance $S_D$) and then again this force decreases to zero as soon as the inner cutting edge 14 leaves the sickle-shaped cross-section.

Therefore, it is most reasonable to have at least four cutting edges (i.e. four inner and four outer cutting edges) and to provide a sufficient step distance $S_D$, such as for instance shown in FIG. 8 as $S_D$=0.3 D, resulting in the effect that once one of the inner cutting edges has passed the point of maximum engagement with the workpiece and thus the radial balancing force thereof decreases, the next inner cutting edge enters the sickle-shaped cross-section, starting to impart an increasing balancing force on the tool.

Accordingly, the radial inwardly and outwardly directed forces generated by the sloping cutting edges cannot be exactly balanced during a complete revolution of the tool, but still the otherwise (without the sloping cutting edges) occurring unbalance is substantially reduced, and any resulting radial force acting on the tool will just slightly vary about any definitely reduced mean value defined by partly or even fully balanced forces.

In summary, the above-mentioned rule that the inner cutting edge should cut about the same amount of material as the outer cutting edge is just a rough approximation for the optimum conditions which are still dependent on all further parameters. Taking the aforementioned considerations together, it has been found that an optimum set of parameters for a tool with four cutting edges may be obtained once the radius of the circle defined by the transition point 13 falls within a range of 0.74 to 0.78 of the radius of the tool, the angles $\alpha_1$ and $\alpha_2$ are set equal and both around 80°, such as for instance between 79° and 82°, and the step distance $S_D$ is selected to be about 0.3×D, where D is the diameter of the tool. Further, the radius R of the transition from the outer cutting edge 12 to the minor cutting edge 16 should then be in the order of 0.1×$R_T$, $R_T$ being the radius of the tool.

The invention claimed is:

1. Tool for cutting materials comprising:
a rotatable body with a rotation axis and cutting edges for cutting the material during movement of the body in a first direction parallel to the rotation axis,
wherein the cutting edges comprise inner cutting edges laying on a first surface of revolution which is in the first direction higher at a larger diameter and lower at a smaller diameter,
wherein at a diameter larger than the inner cutting edges outer cutting edges are laying on a second surface of revolution which is in the first direction lower at a larger diameter and higher at a smaller diameter, and
wherein a cone angle $\alpha 1$ is larger than 65°,
wherein the first surface and the second surface intersect at a circle and the inner cutting edges and the outer cutting edges extend to this circle, and
wherein the diameter of the circle falls in the range from between 0.5 D and 0.9 D.

2. Tool according to claim 1, wherein the inner cutting edge extends essentially to the center of the tool.

3. Tool according to claim 1, wherein the outer edge extends substantially to the outer diameter of the tool.

4. Tool for cutting materials comprising:
a rotatable body with a rotation axis and cutting edges for cutting the material during movement of the body in a first direction parallel to the rotation axis,
wherein the cutting edges comprise inner cutting edges laying on a first surface of revolution which is in the first direction higher at a larger diameter and lower at a smaller diameter,
wherein at a diameter larger than the inner cutting edges outer cutting edges are laying on a second surface of revolution which is in the first direction lower at a larger diameter and higher at a smaller diameter,
wherein the first surface and/or the second surface are a cone, and
wherein the cone angles ($\alpha 2, \alpha 1$) are both larger than 65.

5. Tool according to claim 4, wherein the top angle ($\alpha 2$) of the cone of the first surface and the top angle ($\alpha 1$) of the cone of the second surface are approximately equal.

6. Tool for cutting materials comprising:
a rotatable body with a rotation axis and cutting edges for cutting the material during movement of the body in a first direction parallel to the rotation axis,
wherein the cutting edges comprise inner cutting edges laying on a first surface of revolution which is in the first direction higher at a larger diameter and lower at a smaller diameter,
wherein at a diameter larger than the inner cutting edges outer cutting edges are laying on a second surface of revolution which is in the first direction lower at a larger diameter and higher at a smaller diameter,
wherein a cone angle $\alpha 1$ is larger than 65°, and
wherein the transition from the first cutting edge to the second cutting edge occurs along a rounded tip portion having a radius r of curvature from between 0.1 mm and 2 mm.

7. Tool according to claim 1, wherein near the cutting edges the rotatable body is provided on its outside circumference with support planes laying in an approximately cylindrical surface being parallel to the rotation axis.

8. Tool according to claim 1, wherein an inner cutting edge and an outer cutting edge form a cutting tooth.

9. Tool according to claim 8, wherein the support planes are located on the cutting teeth.

10. Tool according to claim 8, wherein the tool has at least two and preferably four cutting teeth.

11. Tool according to claim 10, wherein the tips of the different cutting teeth are located on the same circle about the center of the tool.

12. Tool according to claim 1, wherein the tool is provided with a shank for fastening the tool in a clamp of a machine tool, the shank having a length such that the distance between the clamp and the cutting edges is at least four times the diameter of the cutting edges.

13. Method for machining material using a tool according to claim 1, whereby the tool is rotated and in a first movement moved in the direction of its rotation axis into the material, retracted, moved a step-distance (SD) in a direction perpendicular to its rotation axis and in a next movement moved in the direction of its rotation axis into the material, thereby cutting a sickle-shaped section of material wherein the step-distance (SD) is such that the volume machined by the inner cutting edges from the sickle-shaped section of material is approximately equal to the volume machined by the outer cutting edges.

14. Method for machining material using a tool according to claim 1, whereby the tool is rotated and in a first movement moved in the direction of its rotation axis into the material, retracted, moved a step-distance (SD) in a direction perpendicular to its rotation axis and in a next movement moved in the direction of its rotation axis into the material, thereby cutting a sickle-shaped section of material wherein the step-distance (SD) is such that any moment at least two inner cutting edges are cutting the sickle-shaped section of material.

15. Tool according to claim 3, wherein the outer cutting edge is rounded at the outer diameter of the tool with a radius of curvature between 1/5 and 1/20 of the outer diameter.

16. Tool according to claim 1, wherein the diameter of the circle falls in the range from between 0.6 D and 0.8 D.

17. Tool according to claim 1, wherein the diameter of the circle falls in the range from between 0.74 D and 0.78 D.

18. Tool according to claim 4, wherein the cone angles ($\alpha 2, \alpha 1$) are both larger than 75°.

19. Tool according to claim 18, wherein the cone angles ($\alpha 2, \alpha 1$) are both between 75° and 87°.

20. Tool according to claim 19, wherein the cone angles ($\alpha 2, \alpha 1$) are both within the range from 77° to 87°.

21. Tool according to claim 19, wherein the cone angles ($\alpha 2, \alpha 1$) are both within the range from 79° to 82°.

22. Tool according to claim 6, wherein the radius of curvature is from between 0.2 mm to 0.5 mm.

* * * * *